(12) United States Patent
Chu et al.

(10) Patent No.: US 12,496,018 B2
(45) Date of Patent: Dec. 16, 2025

(54) SYSTEM AND METHOD FOR AUTOMATIC DIAGNOSIS OF MIDDLE EAR DISEASES FROM AN OTOSCOPIC IMAGE

(71) Applicant: Taipei Veterans General Hospital, Taipei (TW)

(72) Inventors: Yuan-Chia Chu, Taipei (TW); Yen-Fu Cheng, Taipei (TW); Wen-Huei Liao, Taipei (TW); Yen-Chi Chen, Taipei (TW)

(73) Assignee: TAIPEI VETERANS GENERAL HOSPITAL, Taipei (TW)

( * ) Notice: Subject to any disclaimer, the term of this patent is extended or adjusted under 35 U.S.C. 154(b) by 132 days.

(21) Appl. No.: 17/949,797

(22) Filed: Sep. 21, 2022

(65) Prior Publication Data

US 2023/0109857 A1    Apr. 13, 2023

Related U.S. Application Data

(60) Provisional application No. 63/248,082, filed on Sep. 24, 2021.

(51) Int. Cl.
*A61B 5/00* (2006.01)
*A61B 1/227* (2006.01)
*G16H 50/20* (2018.01)

(52) U.S. Cl.
CPC .......... *A61B 5/7267* (2013.01); *A61B 5/7275* (2013.01); *G16H 50/20* (2018.01); *A61B 1/227* (2013.01)

(58) Field of Classification Search
CPC . A61B 1/227; A61B 5/7267; A61B 1/000096; A61B 5/7275; G16H 50/20
See application file for complete search history.

(56) References Cited

U.S. PATENT DOCUMENTS

2019/0216308 A1* 7/2019 Senaras ................. G06T 7/0014
2020/0037930 A1* 2/2020 Abramoff .............. G16H 50/30

FOREIGN PATENT DOCUMENTS

| CN | 108899087 A | * | 11/2018 | ................. G06N 3/02 |
| CN | 111191684 A | * | 5/2020 | ............ A61B 1/227 |
| CN | 112446331 A | * | 3/2021 | |

OTHER PUBLICATIONS

Cha, D., Pae, C., Seong, S. B., Choi, J. Y., & Park, H. J. (2019). Automated diagnosis of ear disease using ensemble deep learning with a big otoendoscopy image database. EBioMedicine, 45, 606-614. (Year: 2019).*

(Continued)

*Primary Examiner* — Christopher Koharski
*Assistant Examiner* — Renee C Langhals
(74) *Attorney, Agent, or Firm* — Birch, Stewart, Kolasch Birch, LLP

(57) ABSTRACT

The present disclosure pertains to a method for diagnosing a middle ear disease comprising receiving one or more otoscopic image of a subject, pre-processing the one or more otoscopic image to obtain image data, inputting the image data to a trained network model, generating, using the trained network model, an output that characterizes the health of the subject with respect to the middle ear disease, and generating a diagnostic result based on the output, wherein the trained network model is based on a model selected from the group consisting of a MobileNetV2 model, a NASNetMobile model, and a DenseNet201 model.

3 Claims, 3 Drawing Sheets

(56) References Cited

OTHER PUBLICATIONS

CN-111191684-A translation, machine translated on Apr. 23, 2025 (Year: 2020).*
CN-112446331-A translation, machine translated on Apr. 23, 2025 (Year: 2021).*
Tsutsumi et al., "A Web-Based Deep Learning Model for Automated Diagnosis of Otoscopic Images," Otology & Neurotology Inc., vol. e1383, 2021, pp. 1-7.
Wu et al., "Deep Learning for Classification of Pediatric Otitis Media," Laryngoscope 131, vol. e2346, Jul. 2021, pp. 1-8.

* cited by examiner (A) Normal tympanic membrane   (b) Acute otitis media (C) Acute myringitis   (D) Chronic suppurative otitis media (E) Otitis media with effusion   (F) Tympanic membrane perforation (G) Cerumen impaction   (H) Ventilation tube (I) Tympanic membrane retraction   (J) Otomycosis

SYSTEM AND METHOD FOR AUTOMATIC DIAGNOSIS OF MIDDLE EAR DISEASES FROM AN OTOSCOPIC IMAGE

CROSS REFERENCE TO RELATED APPLICATIONS

This application claims priority to U.S. Provisional Application No. 63/248,082 filed Sep. 24, 2021, the entire contents of which are hereby incorporated by reference.

FIELD OF THE DISCLOSURE

The present invention relates to a method for detection and diagnosis of a middle ear disease, and an electronic device implementing the method.

BACKGROUND OF THE DISCLOSURE

Middle ear diseases such as otitis media and middle ear effusion are amongst the most common issues faced by clinicians providing primary care to children and adolescents. The worldwide prevalence of otitis media and otitis media with effusion are 2.85% and 0.6%, respectively, in the general population and 25.3% and 17.2%, respectively, in childhood [1-3]. Making correct diagnoses through the inspection of ear drums is still a challenge for most general practitioners due to lack of specialty training, and ancillary hearing tests are often needed to achieve better accuracy [4]. Severe complications such as acute mastoiditis, labyrinthitis or meningitis may develop if middle ear diseases are not properly diagnosed and treated in time, and these complications may cause sequalae such as hearing impairment or neurological deficits [5]. Furthermore, some of these middle ear diseases are treated with unnecessary medications, such as broad-spectrum antibiotics, due to the difficulty of making prompt diagnoses [6]. It is not surprising that even experienced otolaryngologists can only reach a diagnostic accuracy of 75% for some middle ear diseases, such as otitis media with effusion [7].

To overcome this diagnostic dilemma and improve diagnostic accuracy, several methods, such as decision trees, support vector machines (SVMs), neural networks and Bayesian decision approaches, have been used to train different learning models and predict whether an image corresponds to a normal ear or an otitis media case [8,9]. Myburgh et al. utilized a video endoscope to acquire images and a cloud server for pre-processing and entered the images into a smartphone-based neural network program for diagnosis. This system can distinguish five different middle ear diseases with a diagnosis rate of 86% [10]. Seok et al. created a deep learning model for detection and identified the fine structures of the tympanic membrane; the interpretation accuracy of the sides of the tympanic membrane can reach 88.6%, and the diagnosis rate of tympanic membrane perforation is 91.4% [11].

Deep learning algorithms with convolutional neural networks (CNNs) have recently been successfully utilized in many medical specialties [12]. Lightweight CNNs such as MobileNet are models derived from CNNs that are widely used in image analysis. The main advantage of using the lightweight CNNs is that they require fewer computing resources than the traditional CNN models, making them suitable for running on mobile devices such as smartphones [13].

Transfer learning and ensemble learning are the new trends for increasing performance and have been proven to be efficient in handling relatively small datasets [14]. While transfer learning algorithms are built for classification, the ensemble learning technique can be further implemented to obtain a more accurate classification result with a weighted voting approach. Transfer learning is a type of learning framework that transfers the parameters of a pretrained model to a new model and can therefore perform a large amount of time-consuming data labelling work and improve the learning performance [15]. Such a lightweight network contains fewer parameters and smaller scales of specific problems and learns the patterns contained in the input data through pretrained models; therefore, it is suitable for mobile devices with constrained computing resources [16].

It is desirable to develop a more efficient and time-saving method that requires no internet or on-line consultation for automatic detection or diagnosis of middle ear diseases on a more accessible device such as a mobile device, e.g., a smartphone.

BRIEF SUMMARY OF THE DISCLOSURE

In one aspect, the present invention provides a computer-implemented method for diagnosing a middle ear disease/condition, comprising: receiving one or more otoscopic image of a subject; pre-processing the one or more otoscopic image to obtain image data; inputting the image data to a trained network model; generating, using the trained network model, an output that characterizes the health of the subject with respect to the middle ear disease/condition; and generating, based on the output, a diagnostic result comprising an indication of presence of the middle ear disease/condition in the subject, a numerical value representing a probability that the subject has the middle ear disease/condition, a classification of the middle ear disease/condition in the subject, or a combination thereof; wherein the trained network model is based on a model selected from the group consisting of a MobileNetV2 model, a NASNetMobile model, and a DenseNet201 model.

In another aspect, the present invention provides an electronic device comprising: one or more processors; and a non-transitory computer-readable storage medium storing computer-executable instructions that when executed by the one or more processors cause the one or more processors to at least: receive one or more otoscopic image of a subject; pre-process the one or more otoscopic image to obtain image data; input the image data to a trained network model; generate, using the trained network model, an output that characterizes the health of the subject with respect to the middle ear disease/condition; and generate, based on the output, a diagnostic result comprising an indication of presence of the middle ear disease/condition in the subject, a numerical value representing a probability that the subject has the middle ear disease/condition, a classification of the middle ear disease/condition in the subject, or a combination thereof; wherein the trained network model is based on a model selected from the group consisting of a MobileNetV2 model, a NASNetMobile model, and a DenseNet201 model.

In a further aspect, the present invention provides a non-transitory computer-readable storage medium storing computer-executable instructions that when executed by one or more processors cause the one or more processors to at least: receive one or more otoscopic image of a subject; pre-process the one or more otoscopic image to obtain image data; input the image data to a trained network model; generate, using the trained network model, an output that characterizes the health of the subject with respect to the middle ear disease/condition; and generate, based on the output, a diagnostic result comprising an indication of presence of the middle ear disease/condition in the subject, a numerical value representing a probability that the subject has the middle ear disease/condition, a classification of the middle ear disease/condition in the subject, or a combination thereof; wherein the trained network model is based on a model selected from the group consisting of a MobileNetV2 model, a NASNetMobile model, and a DenseNet201 model.

In some embodiments, the middle ear disease/condition is selected from the group consisting of acute myringitis, acute otitis media, cerumen impaction, chronic suppurative otitis media, otitis media with effusion, tympanic membrane retraction, otomycosis, tympanic membrane perforation, and eardrum with a ventilation tube.

In some embodiments, the classification classifies the middle ear disease/condition as one of acute myringitis, acute otitis media, cerumen impaction, chronic suppurative otitis media, otitis media with effusion, tympanic membrane retraction, otomycosis, tympanic membrane perforation, and eardrum with a ventilation tube.

In some embodiments, the trained network model is a transfer learning model based on a recommendation model.

In some embodiments, the recommendation model is based on a model selected from the group consisting of an Xception model, a ResNet50 model, a VGG16 model, a VGG19 model, an InceptionV3 model, and a NASNetLarge model. According to certain embodiments of the present invention, the recommendation model is based on an InceptionV3 model.

In some embodiments, the electronic device is a mobile device.

It is to be understood that both the foregoing general description and the following detailed description are exemplary and explanatory only and are not restrictive of the disclosure.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred.

In the drawings.

DETAILED DESCRIPTION OF THE DISCLOSURE

Figure 1:
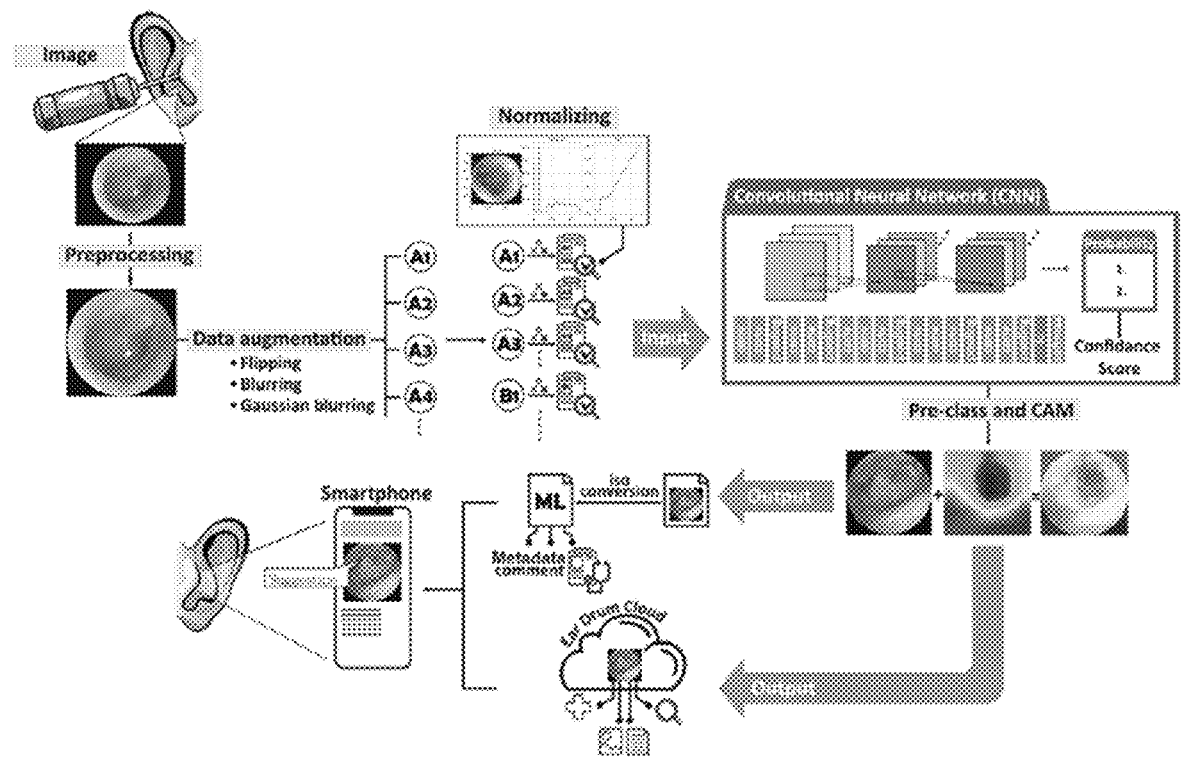
FIG. 1 is a schematic diagram illustrating the development of a smartphone-based computing service for diagnosing a middle ear disease/condition. The main architecture of our AI model is a CNN with transfer learning. Each layer extracts different tympanic membrane/intermediate image features, and all the extracted features are integrated to determine the type of middle ear disease and the corresponding treatment. Subsequently, a Core ML model was developed for this new smartphone-based eardrum application, where users can upload eardrum images to the cloud. The eardrum App analyses the input image and indicates the type of middle ear disease and the treatment to be performed based on the results.

The following embodiments when read with the accompanying drawings are made to clearly exhibit the above-mentioned and other technical contents, features and effects of the present disclosure. Through the exposition by means of the specific embodiments, people would further understand the technical means and effects of the present disclosure adopted to achieve the above-indicated objectives. Moreover, as the contents disclosed herein can be readily understood and implemented by a person skilled in the art, all equivalent changes or modifications which do not depart from the concept of the present disclosure shall be encompassed by the appended claims.

Unless defined otherwise, all technical and scientific terms used herein have the same meaning as commonly understood by a person skilled in the art to which this disclosure belongs.

As used herein, the singular forms "a", "an", and "the" include plural referents unless the context clearly dictates otherwise. Thus, for example, reference to "a sample" includes a plurality of such samples and equivalents thereof known to those skilled in the art.

In one aspect, the present invention provides a computer-implemented method for diagnosing a middle ear disease/condition, comprising:

receiving one or more otoscopic image of a subject;
pre-processing the one or more otoscopic image to obtain image data;
inputting the image data to a trained network model;
generating, using the trained network model, an output that characterizes the health of the subject with respect to the middle ear disease/condition; and
generating, based on the output, a diagnostic result comprising an indication of presence of the middle ear disease/condition in the subject, a numerical value representing a probability that the subject has the middle ear disease/condition, a classification of the middle ear disease/condition in the subject, or a combination thereof;
wherein the trained network model is based on a model selected from the group consisting of a MobileNetV2 model, a NASNetMobile model, and a DenseNet201 model.

In another aspect, the present invention provides an electronic device comprising: one or more processors; and a non-transitory computer-readable storage medium storing computer-executable instructions that when executed by the one or more processors cause the one or more processors to at least:

receive one or more otoscopic image of a subject;
pre-process the one or more otoscopic image to obtain image data; input the image data to a trained network model;

generate, using the trained network model, an output that characterizes the health of the subject with respect to the middle ear disease/condition; and generate, based on the output, a diagnostic result comprising an indication of presence of the middle ear disease/condition in the subject, a numerical value representing a probability that the subject has the middle ear disease/condition, a classification of the middle ear disease/condition in the subject, or a combination thereof;

wherein the trained network model is based on a model selected from the group consisting of a MobileNetV2 model, a NASNetMobile model, and a DenseNet201 model.

Methods and electronic devices of the present invention may be used in assessing the risk of a subject developing a disease or condition, more specifically, a middle ear disease or condition.

"Assessing the risk of a subject developing a disease or condition" refers to the determination of the chance or the likelihood that the subject will develop the disease or condition. This may be expressed as a numerical probability in some embodiments.

The middle ear disease/condition may be selected from the group consisting of acute myringitis, acute otitis media, cerumen impaction, chronic suppurative otitis media, otitis media with effusion, tympanic membrane retraction, otomycosis, tympanic membrane perforation, and eardrum with a ventilation tube.

In some embodiments, the classification classifies the middle ear disease/condition as one of acute myringitis, acute otitis media, cerumen impaction, chronic suppurative otitis media, otitis media with effusion, tympanic membrane retraction, otomycosis, tympanic membrane perforation, and eardrum with a ventilation tube.

In some embodiments, the trained network model is a transfer learning model based on a recommendation model.

In some embodiments, the recommendation model is based on a model selected from the group consisting of an Xception model, a ResNet50 model, a VGG16 model, a VGG19 model, an InceptionV3 model, and a NASNetLarge model. According to certain embodiments of the present invention, the recommendation model is based on an InceptionV3 model.

In some embodiments, the electronic device is a mobile device.

As used herein, the term "mobile device," also known as a handheld computer, refers to a computer small enough to hold and operate in the hand, and may run mobile operating systems that allow third-party applications (Apps) specialized for said capabilities to be installed and run. Examples of the mobile device include but are not limited to a laptop computer, a tablet computer, or a personal digital assistant (PDA), a smartphone, an internet of thing (IoT) device or any other suitable portable or mobile electronic device. In the present disclosure, the preferred example is a smartphone, or an otoscope with a connection to internet.

An otoscopic image may be pre-processed by applying any of a variety of conventional image processing techniques to the image to improve the quality of the output generated by the machine learning model. As an example, a computer or a mobile device may be used to crop, scale, deskew or re-center the image. As another example, a computer or a mobile device may be used to remove distortion from the image, e.g., to remove blurring or to re-focus the image, using conventional image processing techniques.

Validation of the machine-learning diagnosis allows artificial neural network (ANN) to support the diagnosis by a physician or to perform diagnose, allows the physician to perform treatment based on the diagnosis, or allows the ANN to support the treatment by the physician or to perform the treatment.

A method for validating machine-learning may include creating an input that maximizes an ANN output (Activation maximization) method. For the ANN that deals with classification problems, the output is a classification probability for each category. Here, estimation of the reasons for determination may be performed by finding an input in which classification probability of a certain category is quite high, and specifying a "representative example" of the corresponding category by the ANN.

Alternatively, a method of Sensitivity Analysis for analyzing the sensitivity for the input may be used. That is, when the input feature amount has a large influence on the output, the input feature can be regarded as an important feature quantity, and the amount of change indicating which of the inputs the ANN is sensitive is examined. The amount of change can be determined by a gradient. Since the ANN learns by the gradient, ANN is well suited to an already available optimization mechanism.

The system may include a health analysis subsystem that receives the output and generates the diagnostic result. Generally, the health analysis subsystem generates a diagnostic result that characterizes the output in a way that can be presented to a user of the system. The health analysis subsystem can then provide the diagnostic result for presentation to the user in a user interface, e.g., on a computer of a medical professional, store the diagnostic result for future use, or provide the diagnostic result for use for some other immediate purpose.

In some embodiments, the diagnostic result also includes data derived from an intermediate output of the DL network or DL model that explains the portions of the otoscopic image or images that the machine learning model focused on when generating the output. In particular, in some embodiments, the DL model includes an attention mechanism that assigns respective attention weights to each of multiple regions of an input otoscopic image and then attends to features extracted from those regions in accordance with the attention weights. In these embodiments, the system can generate data that identifies the attention weights and include the generated data as part of the diagnostic result. For example, the generated data can be an attention map of the otoscopic image that reflects the attention weights assigned to the regions of the image.

The DL network may be a deep convolutional neural network and includes a set of convolutional neural network layers, followed by a set of fully connected layers, and an output layer. It will be understood that, in practice, a deep convolutional neural network may include other types of neural network layers, e.g., pooling layers, normalization layers, and so on, and may be arranged in various configurations, e.g., as multiple modules, multiple subnetworks, and so on.

In some embodiments, the output is a set of scores, with each score being generated by a corresponding node in the output layer. As will be described in more detail below, in some cases, the set of scores are specific to particular medical condition. In some other cases, the each score in the set of scores is a prediction of the risk of a respective health event occurring in the future. In yet other cases, the scores in the set of scores characterize the overall health of the subject.

Generally, the set of scores are specific to a particular medical condition that the system has been configured to analyze. In some embodiments, the medical condition is acute myringitis, acute otitis media, cerumen impaction, chronic suppurative otitis media, otitis media with effusion, tympanic membrane retraction, otomycosis, tympanic membrane perforation, or eardrum with a ventilation tube.

In some embodiments, the set of scores includes a single score that represents a likelihood that the patient has the medical condition. For example, the single score may represent a likelihood that the subject has acute myringitis, acute otitis media, cerumen impaction, chronic suppurative otitis media, otitis media with effusion, tympanic membrane retraction, otomycosis, tympanic membrane perforation, or eardrum with a ventilation tube.

In some other embodiments, the set of scores includes a respective score for each of multiple possible types of middle ear disease or condition.

For example, the set of scores may include a score for acute myringitis, acute otitis media, cerumen impaction, chronic suppurative otitis media, otitis media with effusion, tympanic membrane retraction, otomycosis, tympanic membrane perforation, or eardrum with a ventilation tube.

The system may generate diagnostic result from the scores. For example, the system can generate diagnostic result that identifies the likelihood that the subject has a middle ear disease or identifies one or more middle ear disease/condition types that have the highest scores.

computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

Computers suitable for the execution of a computer program can be based on general or special purpose microprocessors or both, or any other kind of central processing unit. Generally, a central processing unit will receive instructions and data from a read only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

The present invention provides in a further aspect a non-transitory computer-readable storage medium storing computer-executable instructions that when executed by one or more processors cause the one or more processors to at least: receive one or more otoscopic image of a subject; pre-process the one or more otoscopic image to obtain image data; input the image data to a trained network model; generate, using the trained network model, an output that characterizes the health of the subject with respect to the middle ear disease/condition; and generate, based on the output, a diagnostic result comprising an indication of presence of the middle ear disease/condition in the subject, a numerical value representing a probability that the subject has the middle ear disease/condition, a classification of the middle ear disease/condition in the subject, or a combination thereof; wherein the trained network model is based on a model selected from the group consisting of a MobileNetV2 model, a NASNetMobile model, and a DenseNet201 model.

The present disclosure also provides a method for establishing a detection or diagnosis of a middle ear disease in a subject by a mobile device, comprising the steps of:
    acquiring a plurality of otoscopic images;
    using a machine learning classifier that classifies each of said a plurality of otoscopic images into one of a plurality of middle ear diseases, wherein the machine learning classifier is generated by the method comprising the steps of:
        pre-processing the otoscopic images to obtain pre-processing images;
        training a convolutional neural network (CNN) using the pre-processing images; and
        transfer training the CNN into a light-weighted CNN;
    integrating the machine learning classifier to a mobile device's application for evaluating the otoscopic images to generate a diagnosis of a middle ear disease.

The present disclosure also provides a method for establishing a detection or diagnosis of a middle ear disease in a subject by a computer, comprising the steps of:
    acquiring a plurality of otoscopic images;
    using a machine learning classifier that classifies each of said a plurality of otoscopic images into one of a plurality of middle ear diseases, wherein the machine learning classifier is generated by the method comprising the steps of:
        pre-processing the otoscopic images to obtain pre-processing images; and
        training a convolutional neural network (CNN) using the pre-processing images; and
    generating a diagnosis of a middle ear disease.

In addition, the present disclosure provides a method to assist the physician in detecting or diagnosis of a middle ear disease by the mobile device-based AI system. It is found in the present disclosure that the model as used can reach an accuracy of at least 90%, even up to 100%, in the interpretation of normal and abnormal eardrum. Furthermore, the method for diagnosis for ten (10) most common middle ear (eardrum) diseases according to the present disclosure provides an average accuracy of at least 90%, even up to 99.5%. The present disclosure provides a probable and effective method and system for diagnosis of a middle ear disease through a mobile device (e.g., a smartphone) interface.

In addition, the present disclosure provides a method to assist a physician in detecting or diagnosing a middle ear disease by mobile device-based AI system. It is found in the present disclosure that the model as used can reach an accuracy of at least 90%, even up to 100%, in the interpretation of normal and abnormal eardrum. Furthermore, the mobile device-based AI system can perform a diagnosis for ten (10) most common middle ear (eardrum) diseases, with an average accuracy of at least 90%, even up to 99.5%.

In a particular embodiment, the present disclosure provides a mobile device-implemented method for detecting or diagnosis of a middle ear disease, which comprises:

generating a machine learning classifier that classifies otoscopic image data, into one of a plurality of classifications for middle ear diseases, wherein the machine learning classifier is generated by the method having the steps of:

pre-processing the otoscopic images to compensate for the levels of brightness and clarity of each image and to deal with the black edge of the image by using a computational theory of Canny edge detection in OpenCV and cutting off most of the black edges to obtain pre-processed images;

training a convolutional neural network (CNN) using the pre-processed images, and transfer training the CNN into a light-weighted CNN;

integrating the machine learning classifier to an application for a mobile device;

taking an otoscopic image of a subject in need thereof;

evaluating the otoscopic image using the machine learning classifier integrated in a mobile device's application; and generating a determination of a middle ear disease to the subject.

According to the present disclosure, the system is a device-side Aim which has the advantage of off-line connection and keeps fast computing power, reducing latency delays and protecting patients' privacy.

In the present disclosure, a mobile device-side reasoning App is established, in which the classification model is pre-trained and stored on the mobile device to classify new images, so cloud computing and Internet services are not required. This method reduces latency, which saves network bandwidth and improves protection of privacy.

More specifically, the mobile device-based AI system is obtained by a CNN model pre-trained by using the combination of the Xception, ResNet50, VGG16, VGG19, Inception V3, MobileNet, NasNetMobile and DenseNet; the model is then integrated into a mobile device (e.g., a smartphone) by Core ML and becomes an application that can analyze a plurality of middle ear diseases, including acute myringitis, acute otitis media, cerumen impaction, chronic suppurative otitis media, otitis media with effusion, tympanic membrane retraction, normal tympanic membrane, otomycosis, tympanic membrane perforation, and ventilation tube.

The present disclosure is further illustrated by the following examples, which are provided for the purpose of demonstration rather than limitation.

EXAMPLES

1. Methods
1.1 Data Acquisition

Our data were acquired from patients with middle ear diseases who sought medical help in the Department of Otolaryngology at Taipei Veterans General Hospital (TVGH) in Taiwan from Jan. 1, 2011 to Dec. 31, 2019. The study protocol was approved by the Institutional Review Board of Taipei Veterans General Hospital (no. 2020-03-001CCF), and the study adhered to the tenets of the Declaration of Helsinki. Informed consent was not applicable due to de-identified data.

The human- and computer-aided diagnosis system implemented in this study is summarized in FIG. 1.

Figure 2:
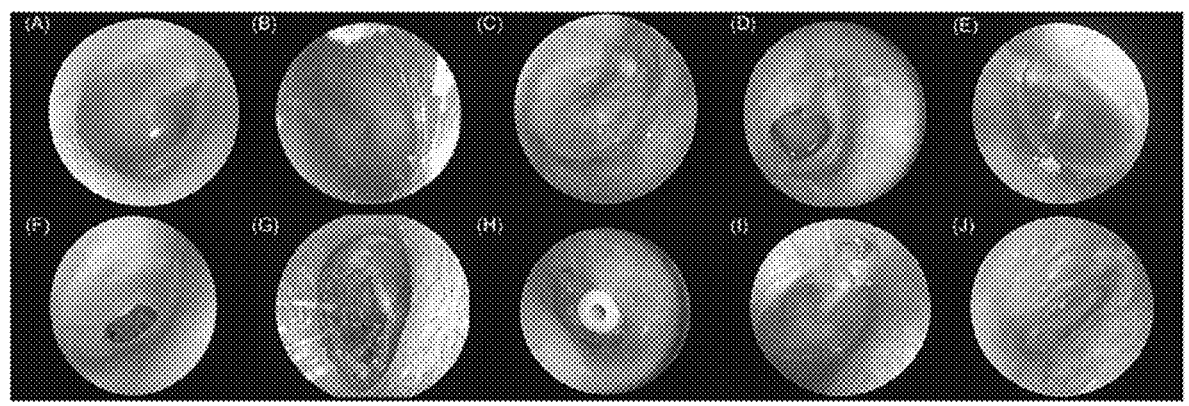
FIG. 2 shows representative images of ten classes of common middle ear conditions/diseases: (A) normal tympanic membrane, (B) acute otitis media, (C) acute myringitis, (D) chronic suppurative otitis media, (E) otitis media with effusion, (F) tympanic membrane perforation, (G) cerumen impaction, (H) eardrum with a ventilation tube, (I) tympanic membrane retraction, and (J) otomycosis.

Data attributes and types include eardrum images and categories (FIG. 2). The ground-truth eardrum classification was annotated by three otolaryngology specialists. First, the otolaryngology specialists determined if the acquired otoendoscopic images were normal or diseased. Next, we checked if there were space-occupying abnormalities or foreign bodies (such as cerumen impactions, otomycosis or ventilation tubes) and then inspected if there were any perforations in the eardrum (chronic suppurative otitis media or tympanic perforation). We then scrutinized whether the middle ear was currently experiencing acute inflammation (acute otitis media or acute myringitis) or chronic inflammation (middle ear effusion or tympanic retraction). Ten classes of common middle ear conditions/diseases were selected and annotated, including (A) normal tympanic membrane, (B) acute otitis media, (C) acute myringitis, (D) chronic suppurative otitis media, (E) otitis media with effusion, (F) tympanic membrane perforation, (G) cerumen impaction, (H) ventilation tube, (I) tympanic membrane retraction, and (J) otomycosis. Because the initial image data were obtained in different sizes, we conducted an initial quality control step, filtering out low-resolution or incorrectly formatted images. The inclusion standard was 224× 224 pixels, which is a 32-bit original image format.

1.2 Data Preparation

Pre-processing is the process of preparing raw data into a format that is suitable for machine learning. The processes, including image classification, the removal of images that cannot be judged by the human eye and the removal of black edges from images, were performed using the OpenCV libraries and Canny edge detection function.

Data augmentation expands the amount of data by generating modified data from an original dataset. As the normal eardrum category accounts for more than half of the original classification data, we deployed several transformation techniques using the OpenCV library, including flips (vertical, horizontal and both) and colour transformations (histogram normalisation, gamma correction, and Gaussian blurring). Images were randomly assigned to either the training set and validation dataset with a ratio of 8:2 ratio using the Scikit-Learn library.

1.3 Development of the Deep Learning Algorithms

Several standard CNN architectures were used to train the middle ear disease detection and classification model, including VGG16, VGG19, Xception, InceptionV3, NASNetLarge, and ResNet50. The training was performed with the Keras library, with TensorFlow as the backend. The final softmax layer was added with two units to fit the number of different target categories in the middle ear disease classification task. Because the weight initialization technique with an ImageNet pretrained network has been shown to improve the convergence speed, we applied this procedure in the initial training of the middle ear disease training model. All the layers of the proposed CNNs were fine-tuned by performing training for 50 epochs using a stochastic gradient descent (SGD) optimizer (a batch size of 32 images, a learning rate of 0.0002, and a moment of 0.8). Our model uses an independent test dataset to evaluate the performance, and both the accuracy and the loss converged during the model training and model validation stages. The same experimental learning rate policy was applied to train all of the tested CNN models. All the AI model training and validation were performed on an IBM AC-922 Linux-based server with a 20-core Power CPU, an NVIDIA V100 SMX2 32-GB GPU card, and 1,024 GB of available RAM.

After the CNN training was completed, the best-performing model was selected as the pretrained model, and the weights were entered into the lightweight mobile CNNs, including NASNetMobile, MobileNetV2, and DenseNet201. The three mobile CNNs with transfer learning were then built for further assessment.

1.4 Model Assessment

We evaluated the performance of the models in terms of their ability to detect and classify middle ear diseases using the following metrics: ROC (receiver operating characteristic) curves (true versus false-positive rate), AUC (area under the receiver operating characteristic curve), accuracy, precision, and recall. Accuracy=(TP+TN)/(TP+TN+FP+FN); precision=TP/(TP+FP); recall or true-positive rate=TP/(TP+FN); false-positive rate=FP/(FP+TN) (TP: true-positive; TN: true-negative; FP: false-positive; FN: false-negative).

The F1-score is the harmonic mean of recall and precision, which are the sum of true positives divided by the sum of all positives and the sum of true positives divided by the sum of all relevant samples. The F1-score considers the number of each label when calculating the recall and precision and is therefore suitable for evaluating the performance on multi-label classification tasks with imbalanced datasets. The model selection was based on the F1-score.

1.5 Class Activation Map

To interpret the prediction decision, a class activation map (CAM) was deployed to recognize the CNN results. The CAM is presented with a rainbow colormap scale, where the red color stands for high relevance, yellow stands for medium relevance, and blue stands for low relevance [17]. This process can effectively visualize feature variations in illuminated conditions, normal structures, and lesions, which are commonly observed in middle ear images. CAMs can provide supplementary analysis for the CNN model so that the location of the disease pre-set by the program can be clearly understood instead of being recognized as an indistinct judgement [17].

1.6 Model Conversion and Integration into a Smartphone Application

The pretrained model was integrated into the smartphone application by using the Python library Core ML Tools. A user provides a middle ear disease image as input. This image is then transformed into a probability distribution over the considered categories of middle ear lesions. The most probable classification (e.g., normal eardrum, acute otitis media, chronic otitis media, tympanic perforation, otitis media with effusion, cerumen impaction, acute myringitis, ventilation tube, eardrum atelectasis, or otomycosis) is then displayed on the screen. The inference process is executed in near-real-time.

1.7 Evaluating the Performance of Clinicians

To compare the performance of our AI program with that of clinicians, 6 practitioners with different levels of expertise, including 2 board-certified otolaryngology specialists (over 5 years of expertise), 2 otolaryngology residents (1-4 years of expertise or training in otolaryngology) and 2 general practitioners (GPS) (less than 1 year of expertise or training in otolaryngology), were recruited. A set of questionnaires was designed with a total of fifty questions, each containing a picture of the endoscopic view of an eardrum from our preliminary data bank of images, and the responders were asked to choose the most suitable option from ten middle ear disease categories.

1.8 Statistical Analysis

The performance of our model was evaluated by the indices of accuracy, precision, recall, and F1-score. The ROC curve and AUC were plotted using the Python Scikit-Learn library. An ROC curve plots true positive rate versus the false positive rate at different classification thresholds. The AUC scales with overall performance across all possible classification thresholds. All statistical tests were two-sided permutation tests. A p-value<0.05 was considered to be statistically significant. The obtained data were entered into Excel and analysed using SPSS (version 24 for Windows; IBM Company, Chicago, USA).

2. Results 2.1 Establishing and Pre-Processing an Eardrum Image Dataset for CNN Model Training A total of 4,954 pictures were initially included in the study. Next, 2,134 pictures were excluded because the photos were not suitable for analysis due to issues such as blurring, duplications, inappropriate positions, and missing medical records. The remaining 2,820 clinical eardrum images were collected and divided into 10 categories. After pre-processing, 2,161 images were selected for further CNN training. To improve the performance of deep learning, the dataset was increased by data augmentation, and the total number of images was expanded to 10,465.

2.2 Diagnostic Performance of the CNN Models and Mobile CNN Models

Six different CNN architectures (Xception, ResNet50, NASNetLarge, VGG16, VGG19, and InceptionV3) were tested on the training dataset, and the performance of the different models based on these ten types of normal and middle ear disease images was verified using the validation dataset. The training process was run for 50 epochs, and the best models with the minimal loss values (corresponding to the 34th, 50th, and 42nd epochs for VGG16, InceptionV3 and ResNet50, respectively) were selected and used for verification. After parameter adjustment, our results show that among the six tested CNN architectures, InceptionV3 exhibited the highest F1-score during validation (98%) and was selected for further transfer learning (Table 1). Our results showed that almost all CNNs achieved a high detection accuracy in binary outcome cases (pass/refer) of middle ear disease images and successfully subclassified the majority of the images. By making use of the confusion matrix and classification report to examine the training results, the average preliminary accuracy achieved on the test dataset reached 91.0%, and the average training time was 6,575 seconds.

Figure 3:
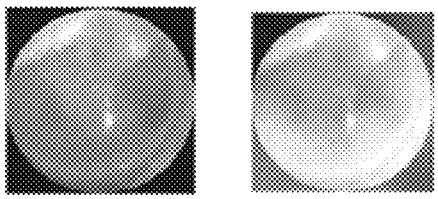
FIG. 3 shows representative class activation maps (CAMs) of 10 common ear drum/middle ear diseases. A CAM is a heatmap-like representation of the data output by global average pooling. The hot spots (red) generated by the CAM represent more important parts of the object, rather than all of it, and it does not produce a segmentation result with fine boundaries.
Figure 3:
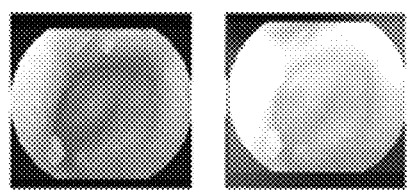
Figure 3:
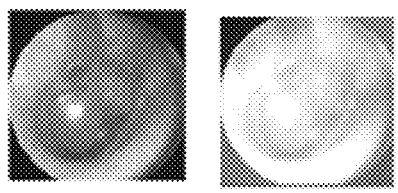
Figure 3:
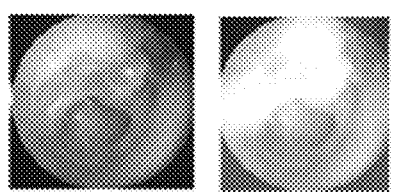
Figure 3:
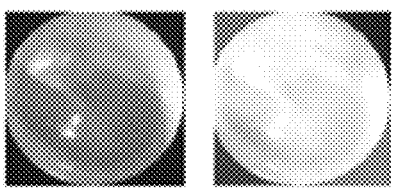
Figure 3:
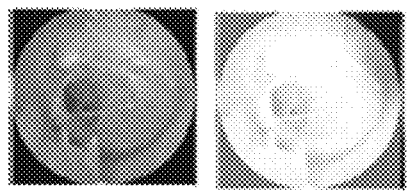
Figure 3:
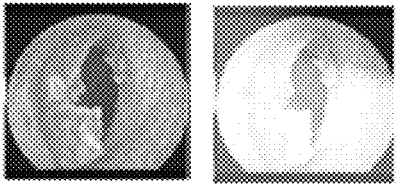
Figure 3:
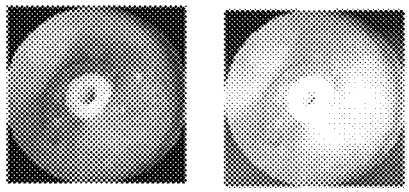
Figure 3:
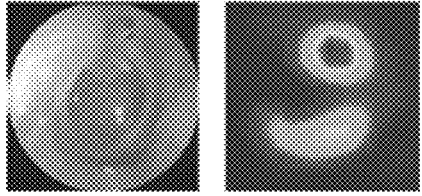
Figure 3:
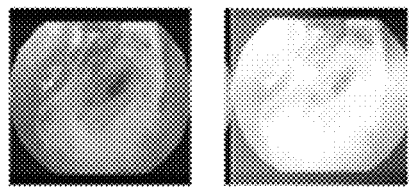

To enable the use of the CNN model on a mobile phone without affecting the accuracy of the model, we further shifted the information contained in different but relatively large source domains by transfer training with three lightweight CNNs, including NASNetMobile, MobileNetV2 and DenseNet201. MobileNetV2 exhibited the highest F1-score during validation (97.6%). The average accuracies and AUCs of the lightweight CNNs transferred with InceptionV3 were 97.3% and 0.98, respectively. The accuracies, recall rates, and F1-scores reached 0.99 for most disease classifications in MobileNetV2. A CAM, which is a representation of the data output by global average pooling, was used to analyse and identify the key features for deep learning image classifications (FIG. 3).

Figure 4:
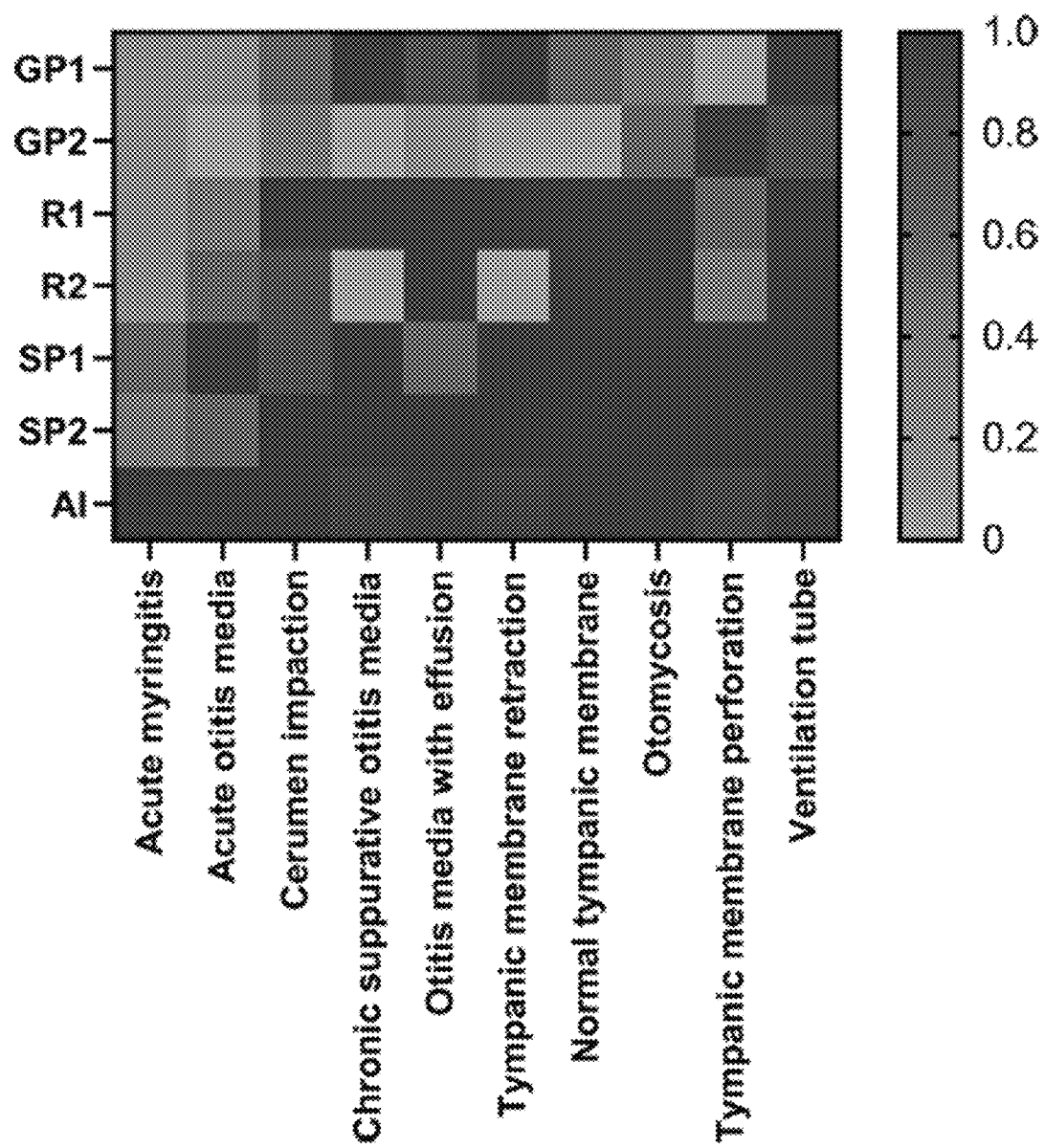
FIG. 4 is a heatmap comparing the results produced by the AI and the human practitioners. GP=general practitioner, R=resident doctor, SP=otolaryngology specialist, AI=artificial intelligence.

2.3 Achieving Specialist Levels of Middle Ear Disease Detection Performance: Interpretation Accuracy Comparison Among General Physicians, Specialists and AI Models A fifty-question questionnaire was designed for practitioners with different levels of clinical experience to assess middle ear diseases in cases selected from the database. The average accuracy rates were 36.0%, 80.0% and 90.0% for the general practitioners, otolaryngologic residents and specialists, respectively. The difference between the specialist and general practitioner groups reached statistical significance ($p<0.005$); however, the difference between the specialist and resident groups was not significant ($p=0.136$). The AI model and specialists had similarly high prediction accuracy scores. On the other hand, less experienced reviewers demonstrated markedly worse prediction accuracy scores, which were separate from the cluster of AI and experienced reviewer scores. For acute myringitis and acute otitis media, AI obviously outperformed the reviewers with all levels of expertise (FIG. 4).

In this study, we developed the first smartphone-based edge AI system to assist clinicians in detecting and categorizing ear drum or middle ear diseases, to our knowledge. Our model successfully distinguished normal eardrums and diseased eardrums and achieved a high detection accuracy. When the data were divided into ten common middle ear diseases, the accuracy reached 97.6%. The model showed a high degree of accuracy in disease prediction and provided the most probable diagnoses ranked by the probability of various diseases on a smartphone interface. In addition, this model is a "device-side AI" (also called "edge AI"); because the computations can be performed locally on the images acquired on mobile devices, this method has the advantage of offline connection with a fast-computing power, which reduces latency delays and protects patient privacy. This study is also the first to investigate several mainstream CNN methods with lightweight architectures for ear drum/middle ear disease detection and diagnosis on mobile devices.

Due to the advancement of image analysis, we found that MobileNet had fewer parameters than other CNN models and was more feasible in mobile devices with less processing power, such as smartphones. Recent studies have shown that although MobileNet is a lightweight network model, its classification accuracy was only 1% less than that of the conventional CNN after conducting the transfer learning-based training technique. Eventually, we successfully developed the CNN system with transfer learning and placed it in a mobile application to make it more convenient and accessible.

The training results of the CNN models showed that the detection and diagnosis of middle ear disease could be achieved and simplified by transfer learning. Therefore, a lightweight model such as MobileNetV2 can also have a comparable accuracy with that of other large models. Using MobileNetV2 and TensorFlow Serving or Core ML technology, the model can be put on a mobile device to assist doctors in the diagnosis of middle ear diseases. The program also revealed a user-friendly interface for assisting diagnoses. For example, the intricate interrogation showed that 9 of the 180 images of chronic suppurative otitis media were diagnosed as tympanic perforation, while 7 of the 155 images of tympanic retraction were diagnosed as otitis media with effusion. In real-world practice, both diseases sometimes coexist and are diagnosed simultaneously. Our solution provides clinicians with the most likely diagnosis by ranking percentages and including the coexisting disease in the first two orders.

In this study, the transfer learning model was used to develop a mobile device application to detect middle ear diseases, so that model inference could be performed without additional cloud resource requirements. Other studies were based on cloud computing methods to perform model inference, which requires internet access and long-latency connections, and personal privacy could be violated. However, our system does not require internet access. In places where medical resources are scarce or mobile internet access is limited, clinicians can make good use of this device to assist in proper the diagnosis of middle ear diseases.

Current AI systems have achieved diagnostic performances that are comparable to those of medical experts in many medical specialties, especially in image recognition-related fields31. Smartphones with features such as high-resolution cameras and powerful computation chips have been extensively used worldwide. The diagnostic accuracy of our smartphone-based AI application was comparable to that of otolaryngology experts. The diagnostic suggestions generated by medical AI may be beneficial for medical professionals with different levels and types of expertise. For non-otolaryngology medical professionals, the proposed algorithm may assist in expert-level diagnosis, leading to seamless diagnoses, increasing the speed of treatment or ensuring a proper referral. For otolaryngology experts, the proposed algorithm may provide an opportunity for shared decision making by providing easily accessible smartphone tools, thereby improving the doctor-patient relationship.

REFERENCES

1. Kim C S, Jung H W, Yoo K Y. Prevalence of otitis media and allied diseases in Korea—results of a nation-wide survey, 1991. Journal of Korean medical science 1993; 8 (1): 34-40.
2. Paradise J L, Rockette H E, Colborn D K, et al. Otitis media in 2253 Pittsburgh-area infants: prevalence and risk factors during the first two years of life. Pediatrics 1997; 99 (3): 318-33.
3. Libwea J N, Kobela M, Ndombo P K, et al. The prevalence of otitis media in 2-3 year old Cameroonian children estimated by tympanometry. International journal of pediatric otorhinolaryngology 2018; 115:181-7.
4. Legros J-M, Hitoto H, Garnier F, Dagorne C, Parot-Schinkel E, Fanello S. Clinical qualitative evaluation of the diagnosis of acute otitis media in general practice. International journal of pediatric otorhinolaryngology 2008; 72 (1): 23-30.
5. Leskinen K, Jero J. Acute complications of otitis media in adults. Clinical Otolaryngology 2005; 30 (6): 511-6.
6. Principi N, Marchisio P, Esposito S. Otitis media with effusion: benefits and harms of strategies in use for treatment and prevention. Expert Review of Anti-infective Therapy 2016; 14 (4): 415-23.
7. Pichichero M E, Poole M D. Comparison of performance by otolaryngologists, pediatricians, and general practioners on an otoendoscopic diagnostic video examination. International journal of pediatric otorhinolaryngology 2005; 69 (3): 361-6.
8. Zafer C. Fusing fine-tuned deep features for recognizing different tympanic membranes. Biocybernetics and Biomedical Engineering 2020; 40 (1): 40-51.

9. Viscaino M, Maass J C, Delano P H, Cheein F A. Computer-aided Ear Diagnosis System based on CNN-LSTM Hybrid Learning Framework for Video Otoscopy Examination. IEEE Access 2021.
10. Myburgh H C, Jose S, Swanepoel D W, Laurent C. Towards low cost automated smartphone- and cloud-based otitis media diagnosis. Biomedical Signal Processing and Control 2018; 39:34-52.
11. Seok J, Song J-J, Koo J-W, Kim H C, Choi B Y. The semantic segmentation approach for normal and pathologic tympanic membrane using deep learning. BioRxiv 2019:515007.
12. Anwar S M, Majid M, Qayyum A, Awais M, Alnowami M, Khan M K J Joms. Medical image analysis using convolutional neural networks: a review. 2018; 42 (11): 1-13.
13. Srinivasu P N, SivaSai J G, Ijaz M F, Bhoi A K, Kim W, Kang J J J S. Classification of skin disease using deep learning neural networks with MobileNet V2 and LSTM. 2021; 21 (8): 2852.
14. Liu X, Liu Z, Wang G, Cai Z, Zhang H. Ensemble transfer learning algorithm. IEEE Access 2017; 6:2389-96.
15. Howard D, Maslej M M, Lee J, Ritchie J, Woollard G, French L J JomIr. Transfer learning for risk classification of social media posts: Model evaluation study. 2020; 22 (5): e15371.
16. Xue D, Zhou X, Li C, et al. An application of transfer learning and ensemble learning techniques for cervical histopathology image classification. IEEE Access 2020; 8:104603-18.
17. Zhou B, Khosla A, Lapedriza A, Oliva A, Torralba A. Learning deep features for discriminative localization. Proceedings of the IEEE conference on computer vision and pattern recognition; 2016; 2016. p. 2921-9.

What we claimed is:

1. A computer-implemented method for diagnosing a middle ear condition, comprising:
    receiving, by one or more processors of the computer, one or more otoscopic image of a subject;
    pre-processing, by the one or more processors, the one or more otoscopic image to obtain image data;
    inputting, by the one or more processors, the image data to a trained deep learning (DL) network model;
    generating, using the trained DL network model, an output that characterizes the health of the subject with respect to the middle ear condition; and
    generating, by the one or more processors, based on the output, a diagnostic result identifying a middle ear condition of the subject, which is selected from ten middle ear conditions including (1) normal tympanic membrane, (2) acute otitis media, (3) acute myringitis, (4) chronic suppurative otitis media, (5) otitis media with effusion, (6) tympanic membrane perforation, (7) cerumen impaction, (8) otomycosis, (9) eardrum with a ventilation tube and (10) tympanic membrane retraction,
    wherein part of data used to train the DL network model is obtained by performing data augmentation on a clinically derived dataset using the following transformation techniques: (i) flips including a vertical flip, a horizontal flip and both, and (ii) color transformations including histogram normalization, gamma correction, and Gaussian blurring,
    wherein said computer-implemented method is configured to, on an independent validation dataset of clinical otoendoscopic images, provide a diagnostic accuracy of at least 97% and an F1-score of at least 0.97 in distinguishing among said ten middle ear conditions, thereby achieving an improvement in diagnostic resolution which permits differentiation among up to ten middle ear conditions of said ten middle ear conditions,
    wherein the trained DL network model is a transfer learning model based on a recommendation model, the recommendation model being an InceptionV3 model and the transfer learning model being selected from the group consisting of a MobileNetV2 model, a NASNet-Mobile model, and a DenseNet201 model, and
    wherein the computer is a mobile device executing model inference locally without requiring cloud-based computation.

2. An electronic device, comprising:
    one or more processors; and
    a non-transitory computer-readable storage medium storing computer-executable instructions that when executed by the one or more processors cause the one or more processors to perform a process comprising:
    receiving one or more otoscopic image of a subject;
    pre-processing the one or more otoscopic image to obtain image data;
    inputting the image data to a trained deep learning (DL) network model;
    generating, using the trained DL network model, an output that characterizes the health of the subject with respect to a middle ear condition; and
    generating, based on the output, a diagnostic result identifying a middle ear condition of the subject, which is selected from ten middle ear conditions including (1) normal tympanic membrane, (2) acute otitis media, (3) acute myringitis, (4) chronic suppurative otitis media, (5) otitis media with effusion, (6) tympanic membrane perforation, (7) cerumen impaction, (8) otomycosis, (9) eardrum with a ventilation tube and (10) tympanic membrane retraction,
    wherein part of data used to train the DL network model is obtained by performing data augmentation on a clinically derived dataset using the following transformation techniques: (i) flips including a vertical flip, a horizontal flip and both, and (ii) color transformations including histogram normalization, gamma correction, and Gaussian blurring,
    wherein said process is configured to, on an independent validation dataset of clinical otoendoscopic images, provide a diagnostic accuracy of at least 97% and an F1-score of at least 0.97 in distinguishing among said ten middle ear conditions, thereby achieving an improvement in diagnostic resolution which permits differentiation among up to ten middle ear conditions of said ten middle ear conditions,
    wherein the trained DL network model is a transfer learning model based on a recommendation model, the recommendation model being an InceptionV3 model and the transfer learning model being selected from the group consisting of a MobileNetV2 model, a NASNet-Mobile model, and a DenseNet201 model, and
    wherein the electronic device is a mobile device executing model inference locally without requiring cloud-based computation.

3. A non-transitory computer-readable storage medium storing computer-executable instructions that when executed by one or more processors cause the one or more processors to perform a process comprising:

receiving one or more otoscopic image of a subject;
pre-processing the one or more otoscopic image to obtain image data;
inputting the image data to a trained deep learning (DL) network model;
generating, using the trained DL network model, an output that characterizes the health of the subject with respect to a middle ear condition; and
generating, based on the output, a diagnostic result identifying a middle ear condition of the subject, which is selected from ten middle ear conditions including (1) normal tympanic membrane, (2) acute otitis media, (3) acute myringitis, (4) chronic suppurative otitis media, (5) otitis media with effusion, (6) tympanic membrane perforation, (7) cerumen impaction, (8) otomycosis, (9) eardrum with a ventilation tube and (10) tympanic membrane retraction,
wherein part of data used to train the DL network model is obtained by performing data augmentation on a clinically derived dataset using the following transformation techniques: (i) flips including a vertical flip, a horizontal flip and both, and (ii) color transformations including histogram normalization, gamma correction, and Gaussian blurring,
wherein said process is configured to, on an independent validation dataset of clinical otoendoscopic images, provide a diagnostic accuracy of at least 97% and an F1-score of at least 0.97 in distinguishing among said ten middle ear conditions, thereby achieving an improvement in diagnostic resolution which permits differentiation among up to ten middle ear conditions of said ten middle ear conditions,
wherein the trained DL network model is a transfer learning model based on a recommendation model, the recommendation model being an InceptionV3 model and the transfer learning model being selected from the group consisting of a MobileNetV2 model, a NASNet-Mobile model, and a DenseNet201 model, and
wherein the computer is a mobile device executing model inference locally without requiring cloud-based computation.

* * * * *